J. LETIZIA.
HAT MIRROR.
APPLICATION FILED FEB. 16, 1920.

1,362,537.

Patented Dec. 14, 1920.

Inventor
John Letizia

By Bernard F. Garvey
Attorney

UNITED STATES PATENT OFFICE.

JOHN LETIZIA, OF JOHNSTOWN, PENNSYLVANIA.

HAT-MIRROR.

1,362,537. Specification of Letters Patent. Patented Dec. 14, 1920.

Application filed February 16, 1920. Serial No. 359,045.

*To all whom it may concern:*

Be it known that I, JOHN LETIZIA, a citizen of the United States, residing at Johnstown, in the county of Cambria and State of Pennsylvania, have invented certain new and useful Improvements in Hat-Mirrors, of which the following is a specification.

This invention relates to attachments for hats and has for an object the securement of a mirror in the crown of the hat.

Another object is to arrange the mirror in the hat crown and secure it from displacement by suitable inexpensive means which will not detract from the appearance of the hat, the mirror being of a size and thickness which will not unduly encumber the hat.

The mirror may be associated, in accordance with the intent of my invention, with practically any style hat and will be of especial value to traveling men.

Other objects of the invention will be in part described and in part understood from the following description of the present preferred form of the invention taken in conjunction with the accompanying drawings, in which.

Figure 1:
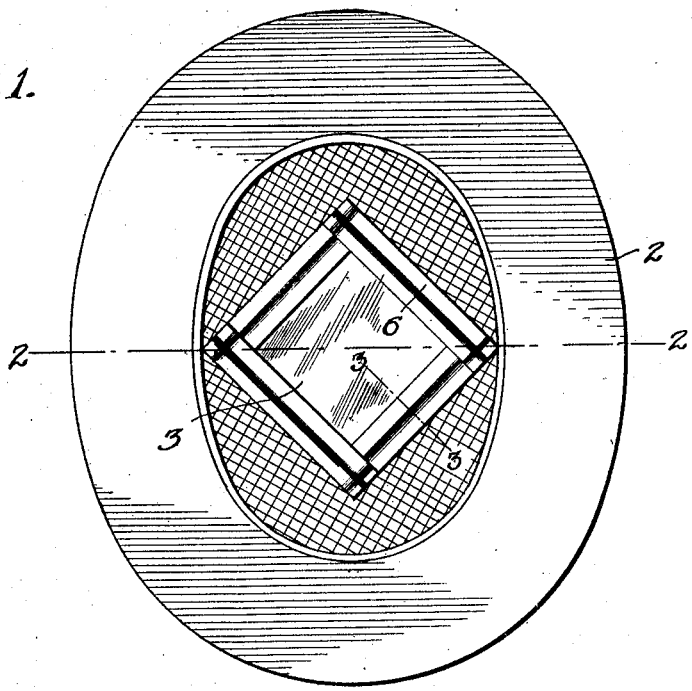
Figure 1, is a bottom plan view of a hat embodying my invention.

In the drawings in order to illustrate the application of my invention a conventional type of straw hat is shown which embodies the usual crown 1 and brim 2.

Mounted on the inner face of the crown of the hat is a mirror 3 of any desired shape, size and thickness, although in the present instance it is shown to be of rectangular configuration, the angles of which are remote from the inner periphery of the hat crown. The inner face of the mirror 3 is coated with a film 4 of a suitable adhesive by which the mirror is secured to the hat crown indirectly through the lining 5 of the hat.

Figure 2:
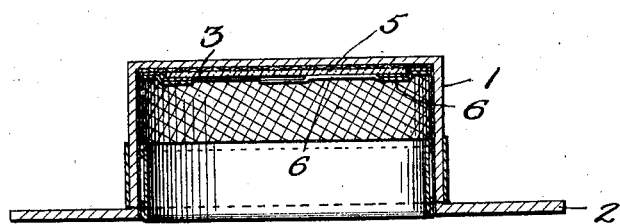
Fig. 2, is a cross sectional view of the same.
Figure 3:
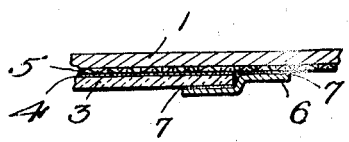
Fig. 3, is a detail enlarged fragmentary sectional view taken on the line 3—3 of Fig. 1.

Strips 6 of flexible material are provided each of which is secured over a margin of the mirror, the ends of the strips being overlapped as best illustrated in Fig. 2 of the drawings. These strips are flexible and are secured to the mirror near its margins, are flexed downwardly over the latter and into engagement with the hat crown. Each of the strips is also coated with a suitable adhesive as indicated at 7 and shown in Fig. 3 to advantage. By arranging the strips in this way it will be appreciated that securement of the mirror in the hat crown will be augmented and moreover these strips will serve as a casing in which the mirror will be mounted. The strips may be suitably ornamented if desired to make the attachment more attractive. Furthermore by arranging the strips over the margins of the mirror the sharp edges of the latter will be covered and moisture will be prevented from seeping between the mirror and the hat crown.

It is to be understood that various changes may be made in the above invention, such for instance as in the size, proportion and arrangement of the parts, as may come within the purview of the appended claim.

What I claim is:—

A hat attachment including a mirror having an adhesive on its back by which it is secured to the hat, strips, each of which lies flat on the top of the mirror, overlaps the margins of the latter and engages the hat beyond the mirror, and an adhesive applied to the undersurface of each strip by which the latter is secured to the mirror and hat to augment retention of the mirror and prevent the seepage of moisture therebeneath.

In testimony whereof I affix my seal.

JOHN LETIZIA.